(12) United States Patent
Tobino

(10) Patent No.: US 9,090,134 B2
(45) Date of Patent: Jul. 28, 2015

(54) PNEUMATIC TIRE

(75) Inventor: Yoshiyuki Tobino, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 429 days.

(21) Appl. No.: 13/611,318

(22) Filed: Sep. 12, 2012

(65) Prior Publication Data

US 2013/0087260 A1   Apr. 11, 2013

(30) Foreign Application Priority Data

Oct. 7, 2011   (JP) ................................ 2011-223168

(51) Int. Cl.
  *B60C 11/11*   (2006.01)
  *B60C 11/12*   (2006.01)

(52) U.S. Cl.
  CPC ............. *B60C 11/11* (2013.01); *B60C 11/1236* (2013.04); *B60C 11/1259* (2013.04); *B60C 2011/0348* (2013.04); *B60C 2011/0367* (2013.04); *B60C 2011/129* (2013.04); *B60C 2011/1209* (2013.04); *B60C 2011/1254* (2013.04); *B60C 2011/1268* (2013.04); *B60C 2011/1295* (2013.04)

(58) Field of Classification Search
  CPC .... B60C 11/11; B60C 11/12; B60C 11/1236; B60C 2011/129; B60C 2011/1295
  USPC .............................. 152/209.2, 209.27, DIG. 3
  See application file for complete search history.

(56) References Cited

U.S. PATENT DOCUMENTS 4,503,898 A * 3/1985 Hitzky ........................ 152/209.2
4,934,424 A * 6/1990 Kojima ..................... 152/209.25
5,385,189 A * 1/1995 Aoki et al. ............... 152/209.21
5,814,169 A * 9/1998 Yamaguchi et al. ..... 152/209.22
2005/0121124 A1   6/2005 Tsubono

FOREIGN PATENT DOCUMENTS

| DE | 4232306 | * | 3/1994 |
| JP | 07-101210 | * | 4/1995 |
| JP | 2890310 B | * | 5/1999 |
| JP | 2004-058838 | * | 2/2004 |
| JP | 2005-162058 A | | 6/2005 |
| JP | 2006-131097 | * | 5/2006 |

OTHER PUBLICATIONS

English machine translation of JP2006-131097, dated May 2006.*
English machine translation of JP2890310B, dated May 1999.*

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A pneumatic tire includes a tread portion including a plurality of land portions separated by at least two longitudinal grooves, a plurality of lateral grooves crossing the longitudinal groove to form a block row, at least one block having at least two sipes extending in an axial direction of the tire to divide at least three block-pieces which include an outer piece and an inner piece relatively arranged in circumferentially inner side of the block than the outer piece, wherein the total axial length of whole sipes is in a range of from 100 to 400 times a tread width, the outer piece of the block has a circumferential length larger than that of the inner piece of the block, and a ratio of the circumferential length of the outer piece to the circumferential length of the inner piece is greater than 1.0 and smaller than 3.0.

10 Claims, 6 Drawing Sheets

PNEUMATIC TIRE

BACKGROUND OF THE INVENTION

1. Field of the Invention

The present invention relates to a pneumatic tire which can improve uneven wear resistance while keeping running performance on icy roads.

2. Description of the Related Art

In order to improve running performance on icy roads, JF-2005-162058A1 proposes a pneumatic tire with a tread portion which comprises a plurality of blocks with cuts or narrow slits so called sipes. These sipes extend in an axial direction of the tire to divide the block into a plurality of block-pieces. Such blocks make friction force on icy roads greater due to each axially extending edge of the block-pieces. Accordingly, traction force and braking force of the tire on icy roads may be improved.

On the other hand, the rigidity of such blocks with sipes inevitably decreases. Especially, uneven wear such as heel and toe wear is liable to occur on circumferentially outmost block-pieces arranged in both sides of the block.

SUMMARY OF THE INVENTION

It is therefore an object of the present invention to provide a pneumatic tire in which uneven wear resistance can be improved while keeping running performance on icy roads.

According to the present invention, a pneumatic tire comprises a tread portion including a plurality of land portions separated by at least two longitudinal grooves extending continuously in a circumferential direction of the tire, a plurality of lateral grooves crossing the longitudinal groove to form a block row which comprises a plurality of blocks arranged in the circumferential direction of the tire, at least one block having at least two sipes extending in an axial direction of the tire to divide at least three block-pieces which include an outer piece and an inner piece relatively arranged in circumferentially inner side of the block than the outer piece, wherein the total axial length of whole sipes is in a range of from 100 to 400 times a tread width, the outer piece of the block has a circumferential length larger than that of the inner piece of the block, and a ratio of the circumferential length of the outer piece to the circumferential length of the inner piece is greater than 1.0 and smaller than 3.0.

Dimensions and the like of portions of the pneumatic tire have values under a standard condition that the tire is mounted on a standard wheel rim and inflated to a standard pressure but loaded with no tire load, unless otherwise stated.

The standard wheel rim is a wheel rim officially approved for the tire by standard organization, i.e. JATMA, T&RA, ETRTO and the like. For example, the standard wheel rim is the "standard rim" specified in JATMA, the "Measuring Rim" in ETRTO, the "Design Rim" in TRA or the like.

The standard pressure is an air pressure for tire specified by the standard organization above. For example, the standard pressure is the "maximum air pressure" in JATMA, the "Inflation Pressure" in ETRTO, the maximum pressure given in the "Tire Load Limits at Various Cold Inflation Pressures" table in TRA or the like.

DESCRIPTION OF THE PREFERRED EMBODIMENTS

An embodiment of the present invention will be described below with reference to the drawings.

Figure 1:
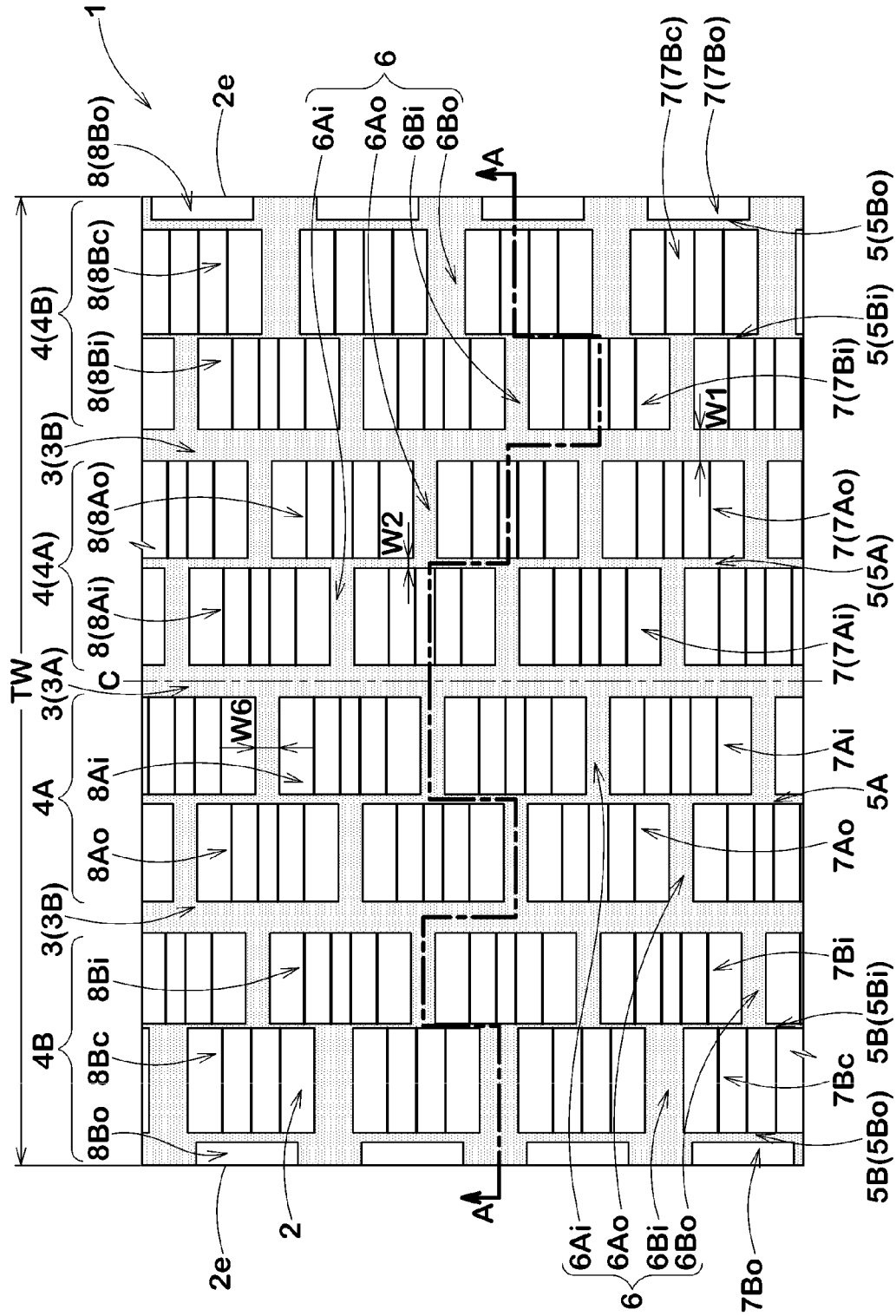
FIG. 1 is a development view of a tread portion of a pneumatic tire of an embodiment of the present invention.

As shown in FIG. 1, a pneumatic tire 1 of the present embodiment (hereinafter, also referred to simply as "tire") is suitably used for heavy duty vehicles such as trucks or buses as a studless tire, for example. The tire 1 comprises a tread portion 2 which includes a plurality of circumferentially and continuously extending longitudinal grooves 3 and a plurality of land portions 4 separated by the longitudinal grooves 3.

The tread portion 2 defines a tread width TW which is an axial length between tread edges 2e. The tread edge 2e means an axially outer edge of the tread portion 2 when it can be clearly identified by appearance. When the axially outer edge of the tread portion 2 cannot be clearly identified by appearance, the tread edge 2e means an axially outer edge of ground contacting patch of the tread portion at a camber angle of zero degree in a standard loaded condition that the tire 1 is mounted on the standard wheel rim and inflated to the standard pressure and loaded with a standard load. Here, the standard load is a tire load specified by the standard organization above. For example, the standard load is the "maximum load capacity" in JATMA, the "Load Capacity" in ETRTO, the maximum value given in the above-mentioned table in TRA or the like.

The longitudinal grooves 3 of the present embodiment comprise a center longitudinal groove 3A disposed on the tire equator C and a pair of shoulder longitudinal grooves 3B, 3B disposed axially outside the center longitudinal grooves 3A.

The center longitudinal groove 3A and the shoulder longitudinal grooves 3B extend in a straight form along the circumferential direction of the tire. The thus configured straight longitudinal grooves can improve not only drainage performance by smoothly discharging water between the tread portion 2 and roads through the longitudinal grooves 3 to backward in the direction of rotation of the tire, but also cornering performance on snow roads due to obtain large shearing force when the tire shears the snow compressed in the grooves 3.

Figure 2:
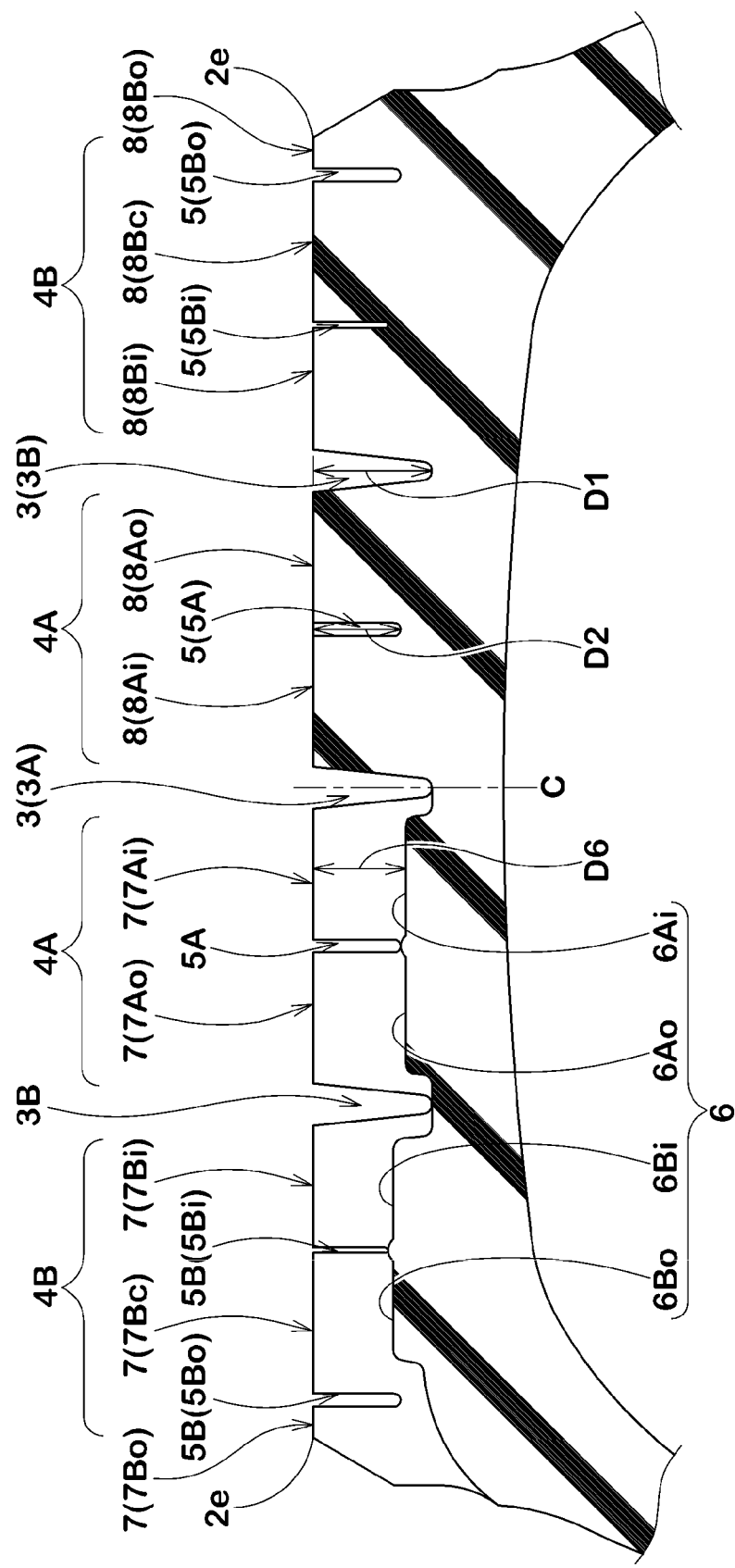
FIG. 2 is a cross sectional view taken along the line A-A of FIG. 1.

In order to efficiently obtain advantages above, the groove widths W1 of the longitudinal grooves 3A and 3B are preferably set in a range of from 2.5 to 4% the tread width TW, and the groove depths D1 (shown in FIG. 2) are preferably set in a range of from 8 to 10% the tread width TW.

Land portions 4 comprise a pair of center land portions 4A provided between the center longitudinal groove 3A and the shoulder longitudinal groove 3B, and a pair of shoulder land portions 4B provided between the shoulder longitudinal groove 3B and the tread edge 2e.

Each of the center land portion 4A and shoulder land portions 4B is provided with a narrow groove 5 extending continuously in the circumferential direction of the tire and a plurality of lateral grooves 6 extending in the axial direction of the tire to divide blocks 7. Accordingly, each of land portions 4A and 4B includes block rows 8 which comprise a plurality of blocks 7 arranged in the circumferential direction of the tire.

The narrow grooves 5 include a center narrow groove 5A provided between the center longitudinal groove 3A and the shoulder longitudinal groove 5B, and shoulder narrow grooves 5B provided between the shoulder longitudinal groove 3B and the tread edge 2e. Moreover, shoulder narrow grooves 5B further include an inner shoulder narrow groove 5Bi and an outer shoulder narrow groove 5Bo disposed by the side of the tread edge 2e.

Each narrow groove 5A, 5Bi and 5Bo also extends in a straight form along the circumferential direction of the tire so as to improve drainage performance and cornering performance on snow roads while keeping the rigidity of land portions 4A and 4B. In order to obtain advantages above, each groove width W2 of narrow grooves 5A, 5Bi and 5Bo is preferably set in a range of from 0.5 to 2% the tread width TW, and each groove depth D2 (shown in FIG. 2) is preferably set in a range of from 4 to 6% the tread width TW.

Lateral grooves 6 include: inner center lateral grooves 6Ai extending between the center longitudinal groove 3A and the center narrow groove 5A; outer center lateral grooves 6Ao extending between the center narrow groove 5A and the shoulder longitudinal groove 3B; inner shoulder lateral grooves 6Bi extending between the shoulder longitudinal groove 3B and the shoulder narrow groove 5Bi; and outer shoulder lateral grooves 6Bo extending between the inner shoulder narrow groove 5Bi and the tread edge 2e.

These lateral grooves 6Ai, 6Ao, 6Bi and 6Bo can improve not only drainage performance by smoothly discharging water between land portions and roads toward the axial direction of the tire, but also running performance on snow roads due to obtain large shearing force when the tire shears the snow compressed in the grooves. In order to obtain advantages above, each groove width W6 of lateral grooves 6Ai, 6Ao, 6Bi and 6Bo is preferably set in a range of from 2 to 3% the tread width TW, and each groove depth D6 (shown in FIG. 2) is preferably set in a range of from 5 to 8% the tread width TW.

Regarding a pair of block rows 8 which are adjacent in the axial direction of the tire, each lateral grooves 6 on the one land portion are disposed to be staggered against lateral grooves 6 on the other land portion in the circumferential direction of the tire. For example, inner center lateral grooves 6Ai and outer center lateral grooves 6Ao are not aligned along the axial direction of the tire. Accordingly, such lateral grooves 6Ai, 6Ao, 6Bi and 6Bo may improve noise performance due to disperse pitch noise of the lateral grooves while improving drainage performance and running performance on snow roads.

Inner center blocks 7Ai and outer center blocks 7Ao are provided in each center land portions 4A. Each inner center blocks 7Ai is separated by the center longitudinal groove 3A, the center narrow groove 5A and inner center lateral grooves 6Ai. Each outer center blocks 7Ao is separated by the center narrow groove 5A, the shoulder longitudinal groove 3B and outer center lateral grooves 6Ao. With this, each center land portion 4A includes an inner center block row 8Ai composed of a plurality of inner center blocks 7Ai, and an outer center block row 8Ao composed of a plurality of outer center blocks 7Ao.

Figure 3:
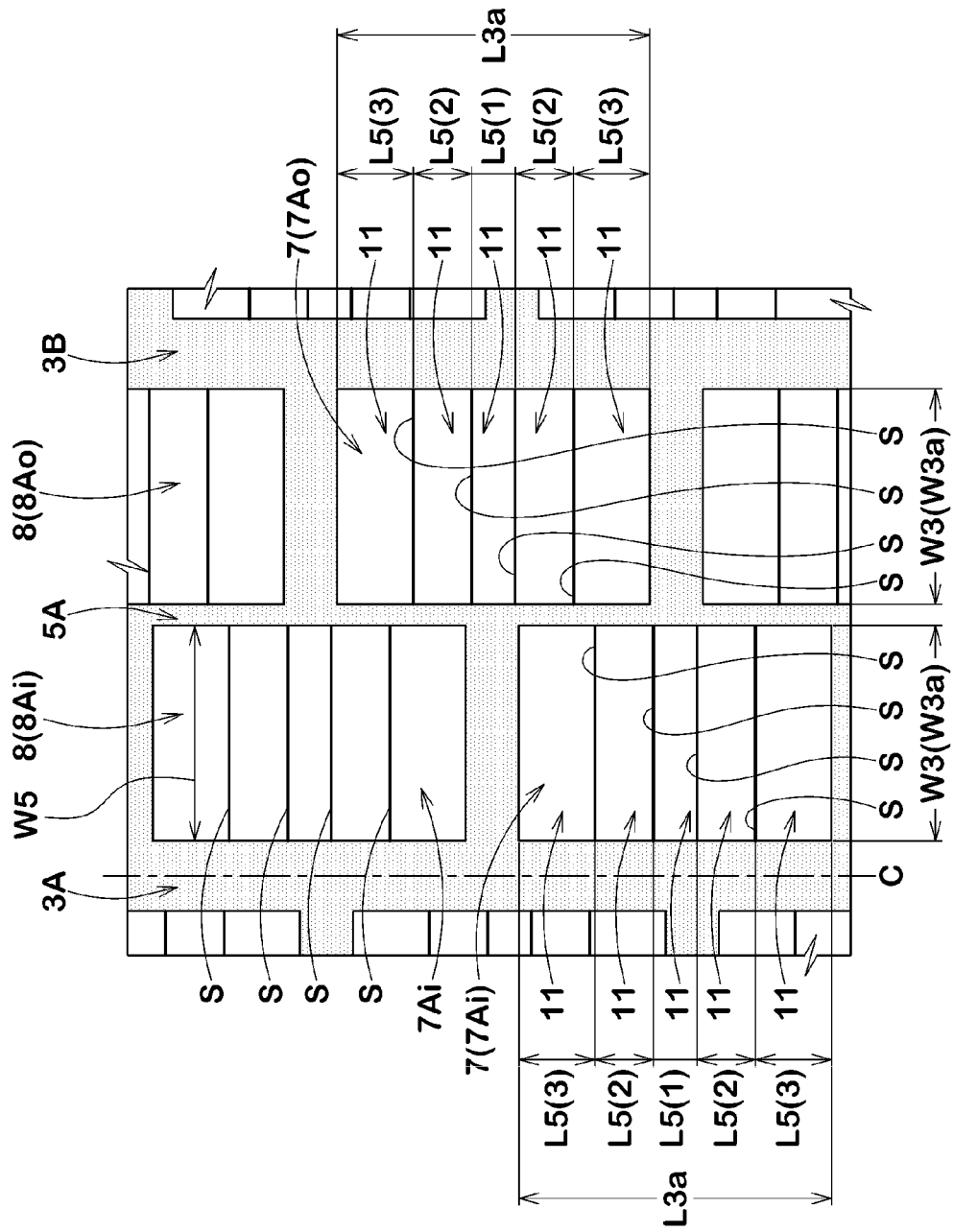
FIG. 3 is a partial enlarged view of a center land portion of FIG. 1.

As shown in the enlarged view of FIG. 3, each of inner center blocks 7Ai and outer center blocks 7Ao has a rectangular shape with the axial width W3a and the circumferential length L3a larger than the axial width W3a.

Since center blocks 7Ai and 7Ao have high rigidity along the circumferential direction, traction and uneven wear resistance can be improved. The axial width W3a of the blocks 7Ai and 7Ao is preferably set in a range of from 8 to 12% the tread width TW (shown in FIG. 1), and the circumferential length L3a of the blocks 7Ai and 7Ao is preferably set in a range of from 12 to 16% the tread width TW.

Moreover, inner center blocks 7Ai and outer center blocks 7Ao are provided on both sides of the center narrow groove 5A with a small groove width. Accordingly, adjacent blocks 7Ai and 7Ao can easily contact and support each other so as to increase the lateral rigidity of the center land portion 4A during cornering. With this, cornering performance and uneven wear resistance can be improved.

As shown in FIG. 1, inner shoulder blocks 7Bi, middle shoulder blocks 7Bc, and outer shoulder blocks 7Bo are provided in each shoulder land portions 4B. Each inner shoulder blocks 7Bi is separated by the shoulder longitudinal groove 3B, the inner shoulder narrow groove 5Bi and inner shoulder lateral grooves 6Bi. Each middle shoulder blocks 7Bc is separated by the inner shoulder narrow groove 5Bi, the outer shoulder narrow groove 5Bo and outer shoulder lateral grooves 6Bo. Each outer shoulder blocks 7Bo is separated by the outer shoulder narrow groove 5Bo, the tread edge 2e and outer shoulder lateral grooves 6Bo. With this, each shoulder land portion 4B includes an inner shoulder block row 8Bi composed of a plurality of inner shoulder blocks 7Bi, a middle shoulder block row 8Bc composed of a plurality of middle shoulder blocks 7Bc and an outer shoulder block row 8Bo composed of a plurality of outer shoulder blocks 7Bo.

Figure 4:
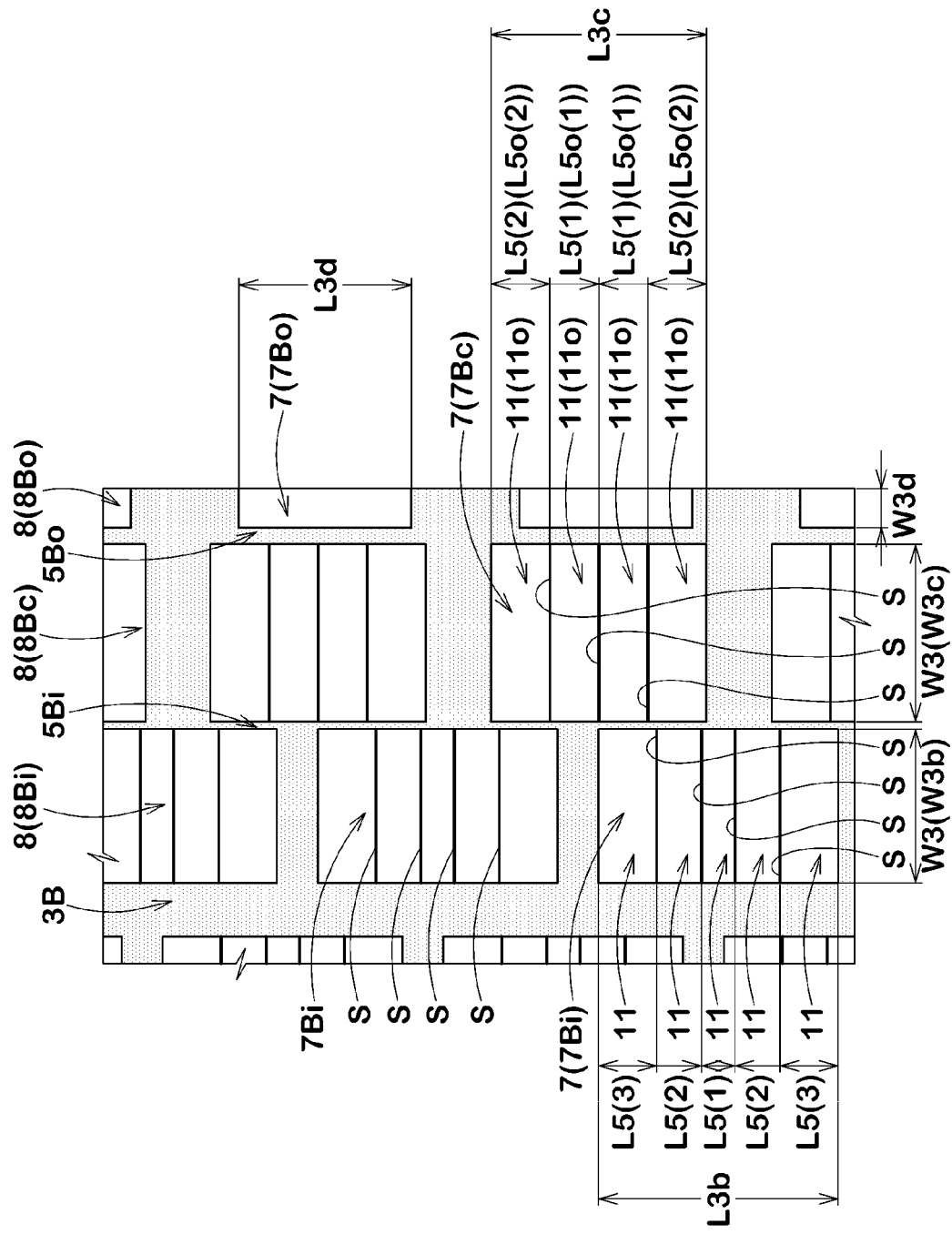
FIG. 4 is a partial perpendicular view of a shoulder land portion.

As shown in the enlarged view of FIG. 4, each inner shoulder block 7Bi also has a rectangular shape with the axial width W3b and the circumferential length L3b larger than the axial width W3b.

Since inner shoulder blocks 7Bi have high rigidity along the circumferential direction, traction and uneven wear resistance can be improved. The axial width W3b and the circumferential length L3b of the inner shoulder blocks 7Bi are preferably set in the same ranges of the width W3a and the length L3a of center blocks 7Ai and 7Ao.

As shown in FIG. 4, each middle shoulder block 7Bc also has a rectangular shape with the axial width W3c and the circumferential length L3c larger than the axial width W3c. Since such middle shoulder blocks 7Bc also have high rigidity along the circumferential direction, traction and uneven wear resistance can be improved. The axial width W3c of the middle shoulder blocks 7Bc is preferably set in a range of from 9 to 13% the tread width TW (shown in FIG. 1), and the circumferential length L3c of the middle shoulder blocks 7Bc is preferably set in a range of from 10 to 14% the tread width TW.

Moreover, inner shoulder blocks 7Bi and middle shoulder blocks 7Bc are provided on both sides of the inner shoulder narrow groove 5Bi with a small groove width. Accordingly, adjacent blocks 7Bi and 7Bo can easily contact and support each other so as to increase the lateral rigidity of the shoulder land portion 4B during cornering. With this, cornering performance and uneven wear resistance can be further improved.

Each outer shoulder block 7Bo also has a rectangular shape with the axial width W3d and the circumferential length L3d larger than the axial width W3d. The axial width W3d of the outer shoulder blocks 7Bo is preferably set in a range of from 1.5 to 4% the tread width TW (shown in FIG. 1), and the circumferential length L3d of the outer shoulder blocks 7Bo is preferably set in a range of from 8 to 12% the tread width TW. Since the outer shoulder block 7Bo has a small rectangular shape like a blade, friction force on snow and icy roads during cornering may be improved. Also wandering performance of the tire may be improved due to the small rigidity in width direction of the outer shoulder blocks 7Bo.

As shown in FIGS. 3 and 4, at least one block 7 is provided with at least two sipes S extending in the axial direction of the tire. In this embodiment, each of inner center blocks 7Ai, outer center blocks 7Ao, inner shoulder blocks 7Bi and middle shoulder blocks 7Bc is provided with sipes S. From this, each block 7Ai, 7Ao, 7Bi and 7Bc is divided by sipes S into at least three block-pieces 11.

In this embodiment of the present invention, each of inner center block 7Ai, outer center block 7Ao and inner shoulder block 7Bi has four sipes S with intervals in the circumferential direction. Accordingly, each block 7Ai, 7Ao and 7Bi is divided into five block-pieces 11.

Moreover, each middle shoulder block 7Bc has three sipes S with intervals in the circumferential direction in this embodiment of the present invention. Accordingly, each block 7Bc is divided into four block-pieces 11.

Each block-piece 11 has a rectangular shape which has the circumferential length L5 and the axial width W5 (shown in FIG. 3) larger than the length L5. Such blocks 7 with block-pieces 11 can obtain not only a large ground-contact-area due to the small rigidity of blocks 7, but also edge effect of block-pieces 11. Accordingly, traction and braking force on snow and icy roads can be further improved.

In order to further improve the effects above, the total axial length S1 of whole sipes S is preferably set in a range of from 100 to 400 times the tread width TW. If the ratio S1/TW is less than 100, running performance on icy road may not be improved. On the other hand, if the ratio S1/TW is more than 400, uneven wear resistance and steering stability may not be improved due to the low rigidity of the blocks 7. From this point of view, the ratio S1/TW is preferably set in a range of from 150 to 300.

Although the complex elastic modulus E* of block-pieces 11 is not limited, it is preferably set in a range of from 6 to 10 MPa. If the complex elastic modulus E* of block-pieces 11 is less than 6 MPa, uneven wear resistance and steering stability may not be improved due to the low rigidity of the blocks 7. On the other hand, if the complex elastic modulus E* of block-pieces 11 is more than 10 MPa, running performance on icy roads may not be improved due to the high rigidity of blocks 7. From this point of view, the complex elastic modulus E* of block-pieces 11 is preferably set in a range of from 7 to 9 MPa.

Here, the complex elastic modulus E* shall be measured with a viscoelastic spectrometer made by IWAMOTO SEI-SAKUSYO using a rubber specimen. The measuring conditions are as follows: initial elongation 10%, dynamic distortion of plus/minus 2%, frequency 10 Hz, deformation mode of tension and temperature 70 degrees C.

Each block 7Ai, 7Ao 7Bi and 7Bc has at least three block-pieces 11 which include an outer piece and an inner piece relatively arranged in circumferentially inner side of the block than the outer piece. Here, the outer piece of the block 7 has a circumferential length larger than that of the inner piece of the block 7. Namely, the more the block-piece 11 is arranged near the outside in the circumferential direction of the block 7, the larger the circumferential length L5 of the block-piece 11 is.

Accordingly, in each block 7Ai, 7Ao 7Bi and 7Bc, the more the block-piece 11 is arranged near the outside of the block 7, the larger the rigidity of block-piece 11 is. Therefore, the circumferentially outmost block-pieces in the block 7 can be effectively prevented from uneven wear such as the heel-and-toe wear.

Moreover, a ratio L5($x$)/{L5($x$-1)} of the circumferential length L5($x$) of the outer piece 11 to the circumferential length L5($x$-1) of the inner piece is greater than 1.0 and smaller than 3.0.

Here, the reference "L5($x$)" means a circumferential length of one block-piece 11, and "x" means a natural number to identify the circumferential position of the block-piece 11 from a center block-piece located in the center of the block 7. For example, as shown in FIGS. 3 and 4, the circumferential length of center block-piece 11 in blocks 7Ai, 7Ao and 7Bi is identified as L5(1), the circumferential length of the adjacent block-pieces 11 thereof are identified as L5(2), and the circumferential length of the outmost block-pieces 11 are identified as L5(3) in this embodiment. On the other hand, the circumferential length of center block-pieces 11 in blocks 7Bc are identified as L5(1), and the circumferential length of the adjacent block-pieces 11 thereof (outmost block-pieces) are identified as L5(2).

In each block 7Ai, 7Ao, 7Bi and 7Bc, since the rigidity of the block-pieces 11 is gradually increased toward the outside in the circumferential direction of the tire, the heel and toe wear can be effectively prevented. Moreover, since the difference of the rigidity between adjacent block-pieces 11 in the circumferential direction of the tire is limited within a suitable range, other uneven wear such as step wear can be further prevented.

Here, if the ratio L5($x$)/{L5($x$-1)} is not more than 1.0, the heel and toe wear may not be sufficiently prevented. On the other hand, if the ratio L5($x$)/{L5($x$-1)} is not less than 3.0, the difference of rigidity between adjacent block-pieces 11 in the circumferential direction of the tire becomes large, and thereby the uneven wear such as the step wear may not be prevented. From this point of view, the ratio L5($x$)/{L5($x$-1)} is preferably greater than 1.1 and not more than 2.0.

Moreover, it is preferable that the ratio L5($x$)/{L5($x$-1)} of the axially outmost blocks with sipes s, which are the middle shoulder blocks 7Bc in this embodiment, is smaller than that of inner blocks relatively arranged in the axially inner side of the tire than the outermost block. The largest lateral force and contact pressure are applied to the axially outmost blocks 7Bc during cornering. Accordingly, by decreasing difference of rigidity between adjacent block-pieces 11 in the middle shoulder blocks 7Bc compared to the inner shoulder blocks 7Bi, steering stability and uneven wear resistance of the tire can be improved.

In order to further improve effects above, the ratio L5($x$)/{L5($x$-1)} of the axially outmost block 7Bc is preferably greater than 1.0 and equal to or less than 2.0. If the ratio L5($x$)/{L5($x$-1)} of the axially outmost block 7Bc is greater than 2.0, effects above may not be sufficiently achieved. On the other hand, if the ratio L5($x$)/{L5($x$-1)} of the axially outmost block 7Bc is equal to or less than 1.0, the heel and toe wear onto the axially outmost blocks 7Bc may not be sufficiently prevented. From this point of view, the ratio L5($x$)/{L5($x$-1)} of the axially outmost block 7Bc is preferably not more than 1.5.

Adjacent block-pieces 11 through the center narrow groove 5B or the inner shoulder narrow groove 5Bi in the axial direction of the tire are preferably disposed to be staggered along the circumferential direction of the tire, and thereby uneven wear resistance may be further improved. In order to further improve the effect above, adjacent sipes S through the center narrow groove 5B or the inner shoulder narrow groove 5Bi in the axial direction of the tire are preferably disposed to be staggered each other in circumferential direction of the tire.

Figure 5A:
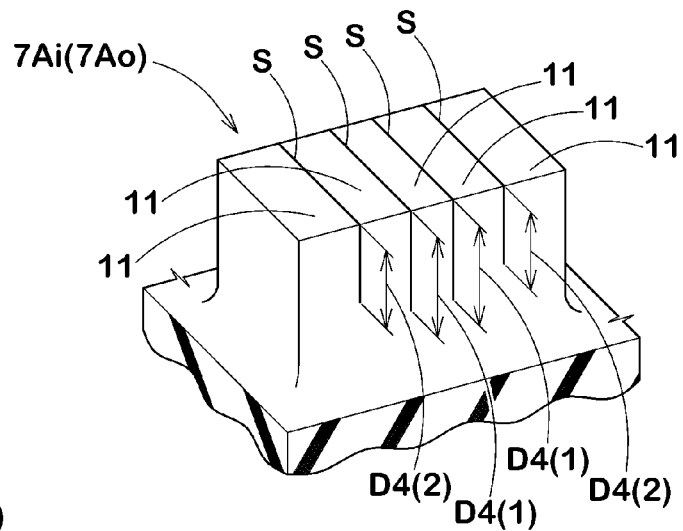
FIG. 5a is a perspective view of an inner or an outer center block.
Figure 5B:
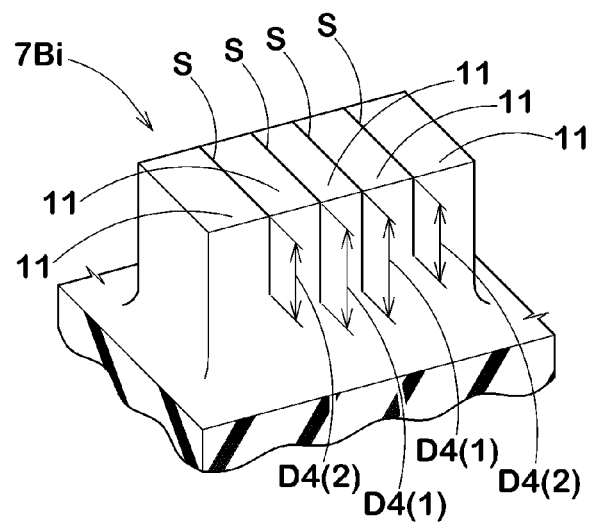
FIG. 5b is a perspective view of an inner shoulder block.
Figure 5C:
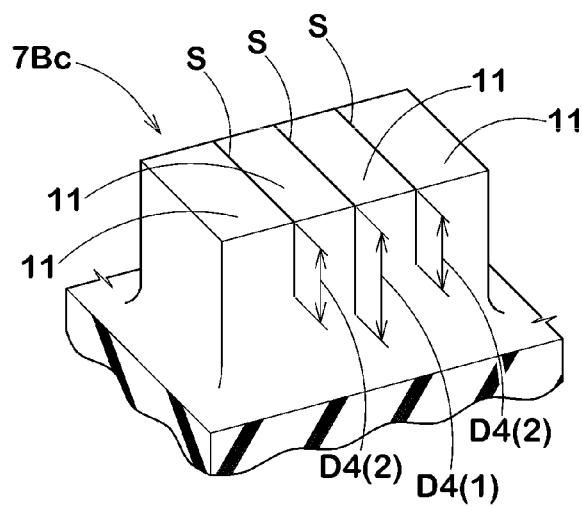
FIG. 5c is a perspective view of a middle shoulder block.

Regarding the depths D4 of sipes S, as shown in FIGS. 5a to 5c, the more the sipe is placed near the outside of the circumferential direction of the block 7, the deeper the depth D4 is. Namely, sipes S which include an outer sipe and an inner sipe relatively arranged in circumferentially inner side of the block 7 than the outer sipe, and the depth D4 of outer sipe is smaller than that of the inner sipe, and thereby the rigidity of block-piece 11 in each block 7Ai, 7Ao 7Bi and 7Bc is gradually increased from the center toward the outside of in the circumferential direction of the block. With this, uneven wear resistance can be further improved.

In order to efficiently improve the effect above, a ratio $D4(y)/\{D4(y-1)\}$ of the depth $D4(y)$ of the outer sipe S to the depth $D4(x-1)$ of the inner sipe S is smaller than 1.0 and not less than 0.7. Here, the reference "$D4(y)$" means a depth of one sipe S, and "y" means a natural number to identify the circumferential position of the sipe S from a center sipe located in the center of the block 7. For example, as shown in FIGS. 5a and 5b, the depth of center sipes s in blocks 7Ai and 7Bi are identified as D4(1), and the depth of the adjacent sipes s thereof are identified as D4(2) in this embodiment.

If the ratio $D4(y)/\{D4(y-1)\}$ is greater than 1.0, the effect above may not be sufficiently achieved. On the other hand, if the ratio $D4(y)/\{D4(y-1)\}$ is smaller than 0.7, the difference of rigidity between adjacent block-pieces 11 becomes larger, and thereby running performance on icy roads and uneven wear resistance may not be sufficiently improved. From this point of view, the ratio $D4(y)/\{D4(y-1)\}$ of sipes S is more preferably not less than 0.80 and not more than 0.95.

In this embodiment, sipes S are shown as full-opened sipes which have both ends opened into both side edges of blocks.

Figure 6:
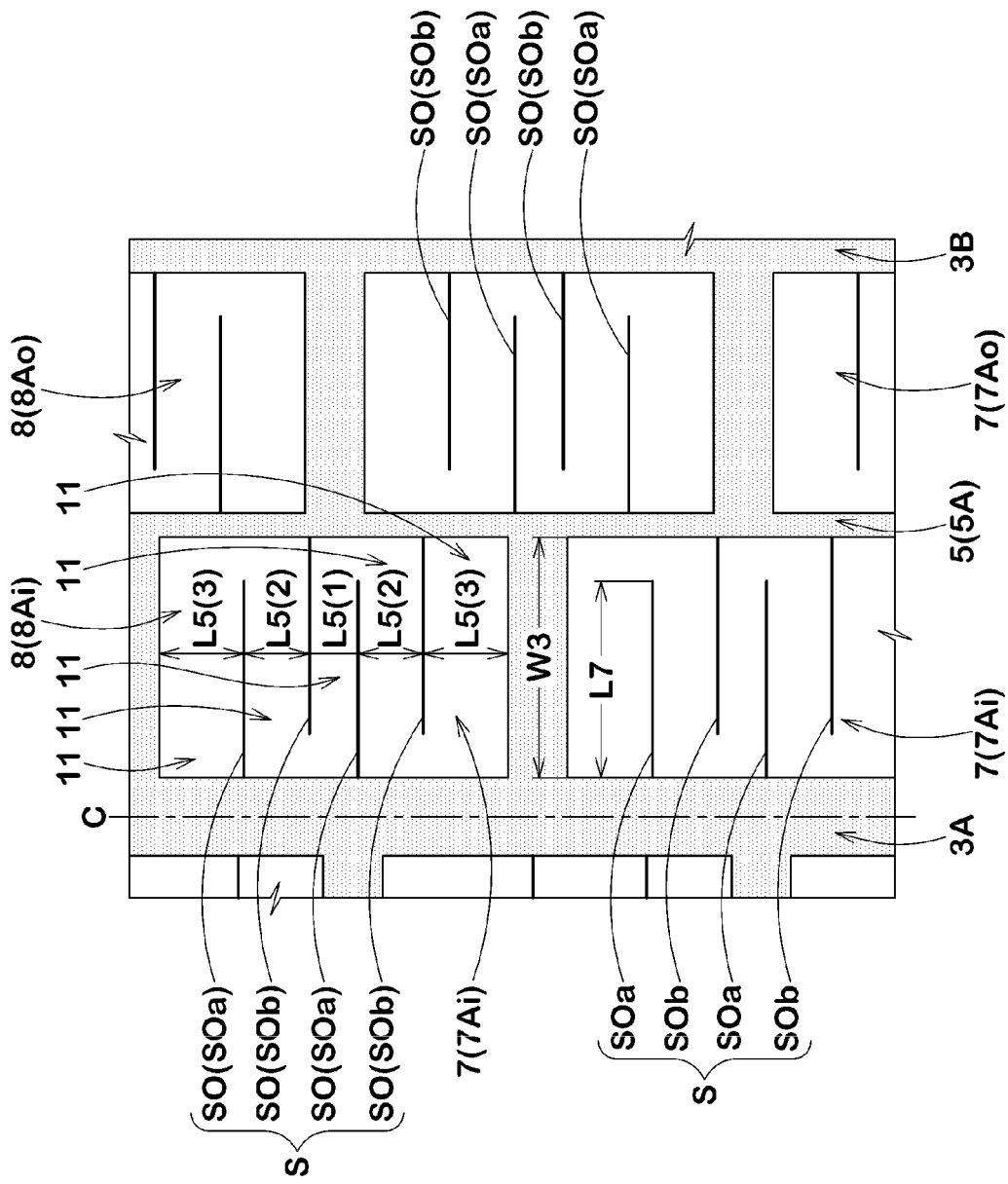
FIG. 6 is a development view of a tread portion of a pneumatic tire of another embodiment of the present invention.

As shown in FIG. 6, as for sipes S, a semi-opened sipe SO may be employed. The semi-opened sipe SO has an opening end opened into a side edge of the block 7 and a closed end terminating in the block 7. Such blocks with a semi-opened sipe SO has a high rigidity while keeping the edge effect of sipes, and thereby steering stability and uneven wear resistance can be improved.

Here, if the semi-opened sipes so are employed on the block 7, the circumferential length L5 of the block-piece 11 is measured as the shortest distance between the semi-opened sipes so, or between the sipe SO and the block end. The axial length L7 of semi-opened sipes SO are preferably set in a range of from 50 to 80% the axial width W3 of the block 7 to obtain the effects both of steering stability and uneven wear resistance.

Semi-opened sipes SO preferably comprise the first sipe SOa with the opening end at one side edge of the block 7 and the second sipe SOb with the opening end at the other side edge of the block 7. Especially, the first sipe SOa and the second sipe SOb are preferably arranged alternately in the circumferential direction of the tire.

The block 7 with the first and second sipes SOa and SOb has the rigidity and axial edges in well-balance, and thereby steering stability and uneven wear resistance can be improved.

While preferable embodiments of the present invention have been described with reference to the drawings, it goes without saying that the present invention is not limited to only such embodiments and various changes and modifications may be made.

Comparative Test:

Tires with a basic structure shown in FIG. 1 and sipes based on Table.1 were manufactured and tested. Common specifications are as follows.

Tire size: 11R22.5 14PR
Rim size: 22.5×7.50
Tread width TW: 260 mm
Each longitudinal groove:
   Groove width W1: 9.1 mm
   Groove depth D1: 20 mm
   Ratio W1/TW: 3.5%
   Ratio D1/TW: 7.7%

Each narrow groove:
   Groove width W2: 2.0 mm to 2.6 mm
   Groove depth D2: 10 mm to 15 mm
   Ratio W2/TW: 0.75% to 1%
   Ratio D2/TW: 3.8% to 5.8%
Each lateral groove:
   Groove width W6: 7.15 mm to 16.9 mm
   Groove depth D6: 14.5 mm
   Ratio W6/TW: 2.75% to 6.5%
   Ratio D6/TW: 5.5%
Inner and outer center blocks:
   Axial Width W3 (W3a): 26 mm
   Circumferential Length L3a: 36.4 mm
   Ratio W3a/TW: 10%
   Ratio L3a/Tw: 14%
Inner shoulder block:
   Axial Width W3 (W3b): 26 mm
   Circumferential Length L3b: 36.4 mm
   Ratio W3b/TW: 10%
   Ratio L3b/Tw: 14%
Middle shoulder block:
   Axial width W3 (W3c): 26 mm
   Circumferential Length L3c: 32.5 mm
   Ratio W3c/TW: 10%
   Ratio L3c/Tw: 12.5%
Outer shoulder block:
   Axial width W3 (W3d): 5.2 mm
   Circumferential Length L3d: 27.3 mm
   Ratio W3d/TW: 2%
   Ratio L3d/Tw: 10.5%

Test procedures are as follows:
Running performance on icy roads:

Test tires with an internal air pressure of 800 kPa were installed on whole wheels of a test dump truck (2-D wheel type dump truck with a carrying capacity of 8.5 tons in a half-loaded condition where 26.72 kN was loaded on the front axle, and 11.38 kN was loaded on the rear axle, respectively), and then the test car was run on an icy road with a surface temperature of from 0 to minus 2 degrees C. A performance during accelerating of the vehicle was evaluated in a feeling test by a professional test driver. The results are shown with an index of 100 representing a value in Ex.1. The larger the value, the better the performance.

Steering stability on dry road:

The foregoing test car was run at a speed of 80 km/hr on a dry asphalt road with a driver, and then the steering stability was evaluated by the test driver's feelings during straight running and cornering. The results are shown with an index of 100 representing a value in Ex.1. The larger the value, the better the steering stability.

Uneven wear resistance:

The foregoing test car was run on a dry asphalt until about 40% wear occurred. Then the amount of uneven wear were measured at three blocks in the circumferential direction of the tire, and the average values of the amount were calculated. Each amount of uneven wear of the block means the difference between the maximum wear at the circumferential end of the block and the minimum wear at center portion of the block. The results are shown in an index of 100 representing a value in example 1. The larger the value, the better the uneven wear resistance.

Wear resistance:

After the uneven wear resistance test, wear-indexes on the three blocks above were calculated using the following the relation, and then average values thereof on each tire were calculated:

Running distance/wear amount.

The results are shown in an index of 100 representing a value in example 1. The larger the value, the better the wear resistance. The results of the Tests are shown in Table 1.

TABLE 1

|  | Ref. 1 | Ex. 1 | Ref. 2 | Ref. 3 | Ex. 2 | Ex. 3 | Ex. 4 |
|---|---|---|---|---|---|---|---|
| Total Axial Length of Sipes S1 (mm) | 30000 | 40000 | 70000 | 70000 | 70000 | 70000 | 70000 |
| Ratio S1/TW | 115 | 154 | 269 | 269 | 269 | 269 | 269 |
| Number of Sipes per Block | 1 | 2 | 4 | 4 | 4 | 4 | 4 |
| Length of block-piece L5(1) (mm) | 15.5 | 6 | 6 | 5 | 5 | 4 | 3 |
| Length of block-piece L5(2) (mm) | — | 12 | 5.5 | 5 | 5.5 | 5.5 | 4.5 |
| Length of block-piece L5(3) (mm) | — | — | 4 | 5 | 6 | 7 | 8 |
| Length of block-piece L5(4) (mm) | — | — | — | — | — | — | — |
| Ratio L5(2)/L5(1) | — | 2 | 0.92 | 1 | 1.1 | 1.38 | 1.5 |
| Ratio L5(3)/L5(2) | — | — | 0.73 | 1 | 1.09 | 1.27 | 1.78 |
| Ratio L5(4)/L5(3) | — | — | — | — | — | — | — |
| Length of Block-piece in axially outmost block L5o(1) (mm) | — | 6 | 6 | 6 | 6 | 6 | 6 |
| Length of Block-piece in axially outmost block L5o(2) (mm) | — | 6.6 | 6.6 | 6.6 | 6.6 | 6.6 | 6.6 |
| Ratio L5o(2)/L5o(1) | — | 1.1 | 1.1 | 1.1 | 1.1 | 1.1 | 1.1 |
| Depth of Sipe D4(1) (mm) | 10 | 10 | 10 | 10 | 12 | 12 | 12 |
| Depth of Sipe D4(2) (mm) | — | — | 10 | 10 | 10 | 10 | 10 |
| Depth of Sipe D4(3) (mm) | — | — | — | — | — | — | — |
| Ratio D4(2)/D4(1) | — | — | 1 | 1 | 0.83 | 0.83 | 0.83 |
| Ratio D4(3)/D4(2) | — | — | — | — | — | — | — |
| Semi-opened sipe | Absence | Absence | Absence | Absence | Absence | Absence | Absence |
| length of semi-opened sipe L7 (mm) | — | — | — | — | — | — | — |
| Ration L7/W3 (%) | — | — | — | — | — | — | — |
| Complex elastic modulus E* of tread (MPa) | 6 | 7.5 | 9 | 9 | 9 | 9 | 9 |
| Running Performance on icy road (Score) | 70 | 100 | 100 | 102 | 110 | 110 | 110 |
| Running Performance on dry road (Score) | 100 | 100 | 100 | 100 | 100 | 105 | 100 |
| Uneven wear resistance (Index) | 80 | 100 | 90 | 91 | 100 | 102 | 100 |
| Wear resistance (Index) | 100 | 100 | 100 | 100 | 100 | 100 | 100 |

|  | Ex. 5 | Ref. 4 | Ref. 5 | Ex. 6 | Ex. 7 | Ex. 8 |
|---|---|---|---|---|---|---|
| Total Axial Length of Sipes S1 (mm) | 70000 | 70000 | 70000 | 70000 | 70000 | 70000 |
| Ratio S1/TW | 269 | 269 | 269 | 269 | 269 | 269 |
| Number of Sipes per Block | 4 | 4 | 4 | 4 | 4 | 4 |
| Length of block-piece L5(1) (mm) | 2 | 2 | 2 | 5 | 5 | 5 |
| Length of block-piece L5(2) (mm) | 3.5 | 3 | 3 | 5.5 | 5.5 | 5.5 |
| Length of block-piece L5(3) (mm) | 9.5 | 9 | 10 | 6 | 6 | 6 |
| Length of block-piece L5(4) (mm) | — | — | — | — | — | — |
| Ratio L5(2)/L5(1) | 1.75 | 1.5 | 1.5 | 1.1 | 1.1 | 1.1 |
| Ratio L5(3)/L5(2) | 2.71 | 3 | 3.33 | 1.09 | 1.09 | 1.09 |
| Ratio L5(4)/L5(3) | — | — | — | — | — | — |
| Length of Block-piece in axially outmost block L5o(1) (mm) | 6 | 6 | 6 | 6 | 6 | 6 |
| Length of Block-piece in axially outmost block L5o(2) (mm) | 6.6 | 6.6 | 6.6 | 6.6 | 6.6 | 6.6 |
| Ratio L5o(2)/L5o(1) | 1.1 | 1.1 | 1.1 | 1.1 | 1.1 | 1.1 |
| Depth of Sipe D4(1) (mm) | 12 | 12 | 12 | 15 | 10 | 10 |
| Depth of Sipe D4(2) (mm) | 10 | 10 | 10 | 10 | 10 | 12 |
| Depth of Sipe D4(3) (mm) | — | — | — | — | — | — |
| Ratio D4(2)/D4(1) | 0.83 | 0.83 | 0.83 | 0.67 | 1 | 1.2 |
| Ratio D4(3)/D4(2) | — | — | — | — | — | — |
| Semi-opened sipe | Absence | Absence | Absence | Absence | Absence | Absence |
| length of semi-opened sipe L7 (mm) | — | — | — | — | — | — |
| Ration L7/W3 (%) | — | — | — | — | — | — |
| Complex elastic modulus E* of tread (MPa) | 9 | 9 | 9 | 9 | 9 | 9 |
| Running Performance on icy road (Score) | 110 | 100 | 105 | 110 | 108 | 105 |
| Running Performance on dry road (Score) | 100 | 98 | 100 | 100 | 100 | 100 |
| Uneven wear resistance (Index) | 98 | 92 | 90 | 98 | 96 | 93 |
| Wear resistance (Index) | 100 | 100 | 100 | 100 | 100 | 100 |

|  | Ex. 9 | Ex. 10 | Ref. 6 | Ex. 11 | Ex. 12 | Ex. 13 | Ex. 14 | Ex. 15 | Ex. 16 |
|---|---|---|---|---|---|---|---|---|---|
| Total Axial Length of Sipes S1 (mm) | 70000 | 93000 | 109200 | 33600 | 44800 | 50400 | 61600 | 60000 | 67000 |
| Ratio S1/TW | 269 | 358 | 420 | 129 | 172 | 194 | 237 | 231 | 258 |
| Number of Sipes per Block | 6 | 6 | 6 | 4 | 4 | 4 | 4 | 6 | 6 |
| Length of block-piece L5(1) (mm) | 2 | 2 | 2 | 5 | 5 | 5 | 5 | 2 | 2 |
| Length of block-piece L5(2) (mm) | 3 | 3 | 3 | 5.5 | 5.5 | 5.5 | 5.5 | 3 | 3 |
| Length of block-piece L5(3) (mm) | 4 | 4 | 4 | 6 | 6 | 6 | 6 | 4 | 4 |
| Length of block-piece L5(4) (mm) | 5 | 5 | 5 | — | — | — | — | 5 | 5 |
| Ratio L5(2)/L5(1) | 1.5 | 1.5 | 1.5 | 1.1 | 1.1 | 1.1 | 1.1 | 1.5 | 1.5 |
| Ratio L5(3)/L5(2) | 1.33 | 1.33 | 1.33 | 1.09 | 1.09 | 1.09 | 1.09 | 1.33 | 1.33 |
| Ratio L5(4)/L5(3) | 1.25 | 1.25 | 1.25 | — | — | — | — | 1.25 | 1.25 |

TABLE 1-continued

| | | | | | | | | | |
|---|---|---|---|---|---|---|---|---|---|
| Length of Block-piece in axially outmost block L5o(1) (mm) | 6 | 6 | 6 | 6 | 6 | 6 | 6 | 6 | 6 |
| Length of Block-piece in axially outmost block L5o(2) (mm) | 6.6 | 6.6 | 6.6 | 6.6 | 6.6 | 6.6 | 6.6 | 6.6 | 6.6 |
| Ratio L5o(2)/L5o(1) | 1.1 | 1.1 | 1.1 | 1.1 | 1.1 | 1.1 | 1.1 | 1.1 | 1.1 |
| Depth of Sipe D4(1) (mm) | 11 | 11 | 11 | 12 | 12 | 12 | 12 | 11 | 11 |
| Depth of Sipe D4(2) (mm) | 10 | 10 | 10 | 10 | 10 | 10 | 10 | 10 | 10 |
| Depth of Sipe D4(3) (mm) | 9 | 9 | 9 | — | — | — | — | 9 | 9 |
| Ratio D4(2)/D4(1) | 0.91 | 0.91 | 0.91 | 0.83 | 0.83 | 0.83 | 0.83 | 0.91 | 0.91 |
| Ratio D4(3)/D4(2) | 0.9 | 0.9 | 0.9 | — | — | — | — | 0.9 | 0.9 |
| Semi-opened sipe | Absence | Absence | Absence | Presence | Presence | Presence | Presence | Presence | Presence |
| length of semi-opened sipe L7 (mm) | — | — | — | 12 | 16 | 18 | 22 | 16 | 18 |
| Ration L7/W3 (%) | — | — | — | 48 | 64 | 72 | 88 | 64 | 72 |
| Complex elastic modulus E* of tread (MPa) | 7.5 | 9 | 9 | 9 | 9 | 9 | 9 | 9 | 9 |
| Running Performance on icy road (Score) | 110 | 115 | 115 | 95 | 103 | 105 | 105 | 108 | 110 |
| Running Performance on dry road (Score) | 97 | 95 | 85 | 105 | 105 | 105 | 100 | 105 | 105 |
| Uneven wear resistance (Index) | 100 | 100 | 95 | 105 | 107 | 105 | 100 | 112 | 110 |
| Wear resistance (Index) | 100 | 95 | 85 | 100 | 100 | 100 | 100 | 100 | 100 |

As the result of the test, it has been confirmed that examples according to the present invention were improved uneven wear resistance while keeping running performance on icy roads.

What is claimed is:

1. A pneumatic tire comprising
a tread portion including a plurality of land portions separated by at least two longitudinal grooves extending continuously in a circumferential direction of the tire,
a plurality of lateral grooves crossing the longitudinal groove to form a block row which comprises a plurality of blocks arranged in the circumferential direction of the tire,
at least one block having at least two sipes extending in an axial direction of the tire to form at least three block-pieces which include an outer piece and an inner piece relatively arranged in circumferentially inner side of the block than the outer piece, said at least one block comprising an axially outermost block and an axially inner block relatively arranged axially inward of the outermost block,
wherein the total axial length of whole sipes is in a range of from 100 to 400 times a tread width, the outer piece of the block has a circumferential length larger than that of the inner piece of the block,
a ratio of the circumferential length of the outer piece to the circumferential length of the inner piece is greater than 1.0 and smaller than 3.0, and
said ratio of the outer most block is smaller than that of the inner block.

2. The pneumatic tire according to claim 1, wherein
said sipes comprise at least one semi-opened sipe which has an opening end opened into a side edge of the block and a closed end terminating in the block.

3. The pneumatic tire according to claim 1, wherein
said sipes comprise a plurality of semi-opened sipes each having an opening end opened into a side edge of the block and a closed end terminating in the block,
said semi-opened sipes comprise a first sipe having the opening end at one side edge of the block and a second sipe having the opening end at the other side edge of the block, and
the first sipe and the second sipe are arranged alternately in the circumferential direction of the tire.

4. The pneumatic tire according to claim 1, wherein
at least one land portion is provided with a narrow groove extending continuously in the circumferential direction of the tire,
said blocks having sipes are arranged on both sides of the narrow groove, and
said block-pieces arranged on both sides of the narrow groove are staggered each other in circumferential direction of the tire.

5. The pneumatic tire according to claim 4, wherein
sipes arranged on both sides of the narrow groove are staggered each other in circumferential direction of the tire.

6. The pneumatic tire according to claim 1, wherein
said blocks comprise at least one block provided with at least three sipes which include an outer sipe and an inner sipe relatively arranged in circumferentially inner side of the block than the outer sipe, and
a depth of outer sipe is smaller than that of the inner sipe.

7. The pneumatic tire according to claim 6, wherein
a ratio of the depth of the outer sipe to the depth of the inner sipe is smaller than 1.0 and greater than 0.7.

8. The pneumatic tire according to claim 6, wherein
said sipes comprise at least one semi-opened sipe which has an opening end opened into a side edge of the block and a closed end terminating in the block.

9. The pneumatic tire according to claim 6, wherein
said sipes comprise a plurality of semi-opened sipes each having an opening end opened into a side edge of the block and a closed end terminating in the block,
said semi-opened sipes comprise a first sipe having the opening end at one side edge of the block and a second sipe having the opening end at the other side edge of the block, and
the first sipe and the second sipe are arranged alternately in the circumferential direction of the tire.

10. The pneumatic tire according to claim 6, wherein
at least one land portion is provided with a narrow groove extending continuously in the circumferential direction of the tire,
said blocks having sipes are arranged on both sides of the narrow groove, and
said block-pieces arranged on both sides of the narrow groove are staggered each other in circumferential direction of the tire.

* * * * *